United States Patent
Kapinos et al.

(10) Patent No.: US 12,101,562 B2
(45) Date of Patent: Sep. 24, 2024

(54) IMAGE GLARE REDUCTION

(71) Applicant: Lenovo (Singapore) Pte. Ltd., Morrisville, NC (US)

(72) Inventors: Robert J Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 288 days.

(21) Appl. No.: 17/703,706

(22) Filed: Mar. 24, 2022

(65) Prior Publication Data

US 2023/0308765 A1    Sep. 28, 2023

(51) Int. Cl.
| | |
|---|---|
| *H04N 23/71* | (2023.01) |
| *G06V 20/60* | (2022.01) |
| *G09G 5/10* | (2006.01) |
| *H04N 23/74* | (2023.01) |

(52) U.S. Cl.
CPC ............. *H04N 23/71* (2023.01); *G06V 20/60* (2022.01); *G09G 5/10* (2013.01); *H04N 23/74* (2023.01); *G09G 2320/0626* (2013.01); *G09G 2320/08* (2013.01)

(58) Field of Classification Search
CPC ........ H04N 23/71; H04N 23/74; H04N 23/60; G06V 20/60; G06V 10/14; G06V 10/993; G09G 5/10; G09G 2320/0626; G09G 2320/08; G06F 3/14
See application file for complete search history.

(56) References Cited

U.S. PATENT DOCUMENTS

| | | | |
|---|---|---|---|
| 2003/0184671 A1* | 10/2003 | Robins | H04N 23/70 348/E5.038 |
| 2012/0229681 A1* | 9/2012 | Ansfield | H04N 5/2621 348/241 |
| 2016/0182801 A1* | 6/2016 | Luk | G06F 3/005 348/207.11 |
| 2018/0020145 A1* | 1/2018 | Kotfis | H04N 23/72 |
| 2019/0102872 A1* | 4/2019 | Moussa | G06T 7/30 |

\* cited by examiner

*Primary Examiner* — Luong T Nguyen
(74) *Attorney, Agent, or Firm* — FERENCE & ASSOCIATES LLC

(57) ABSTRACT

One embodiment provides a method, the method including: receiving, at an image glare reduction system, an indication to capture an image using a user device; determining, using the image glare reduction system, a function of the user device may cause glare in the image; and modifying, using the image glare reduction system and in response to the determining the function may cause glare, an attribute of the user device, wherein the modifying occurs during a shutter operation of the user device occurring during capture of the image.

20 Claims, 3 Drawing Sheets

IMAGE GLARE REDUCTION

BACKGROUND

With the increase in portable user devices that can take pictures, videos, and/or other images (e.g., smart phones, tablets, computers, laptops, cellular phones, smart watches, etc.), it is very common to see people taking pictures in many different settings. People not only take pictures of others, for example, in a posed group where a person outside of the photo takes a picture of the group and referred to as a world picture, but also take pictures that include themselves, referred to as a selfie, which may also include other people. Due to this increase in desire to take both world pictures and selfies, many user devices have both front-facing cameras, generally located on the display side of the device and generally used for capturing the selfie image, and rear-facing cameras, generally located on the back of the device and generally used for capturing world pictures.

BRIEF SUMMARY

In summary, one aspect provides a method, the method including: receiving, at an image glare reduction system, an indication to capture an image using a user device; determining, using the image glare reduction system, a function of the user device may cause glare in the image; and modifying, using the image glare reduction system and in response to the determining the function may cause glare, an attribute of the user device, wherein the modifying occurs during a shutter operation of the user device occurring during capture of the image.

Another aspect provides an information handling device, the information handling device including: a processor; a memory device that stores instructions that, when executed by the processor, causes the information handling device to: receive, at an image glare reduction system, an indication to capture an image using a user device; determine, using the image glare reduction system, a function of the user device may cause glare in the image; and modify, using the image glare reduction system and in response to the determining the function may cause glare, an attribute of the user device, wherein the modifying occurs during a shutter operation of the user device occurring during capture of the image.

A further aspect provides a product, the product including: a computer-readable storage device that stores executable code that, when executed by a processor, causes the product to: receive, at an image glare reduction system, an indication to capture an image using a user device; determine, using the image glare reduction system, a function of the user device may cause glare in the image; and modify, using the image glare reduction system and in response to the determining the function may cause glare, an attribute of the user device, wherein the modifying occurs during a shutter operation of the user device occurring during capture of the image.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
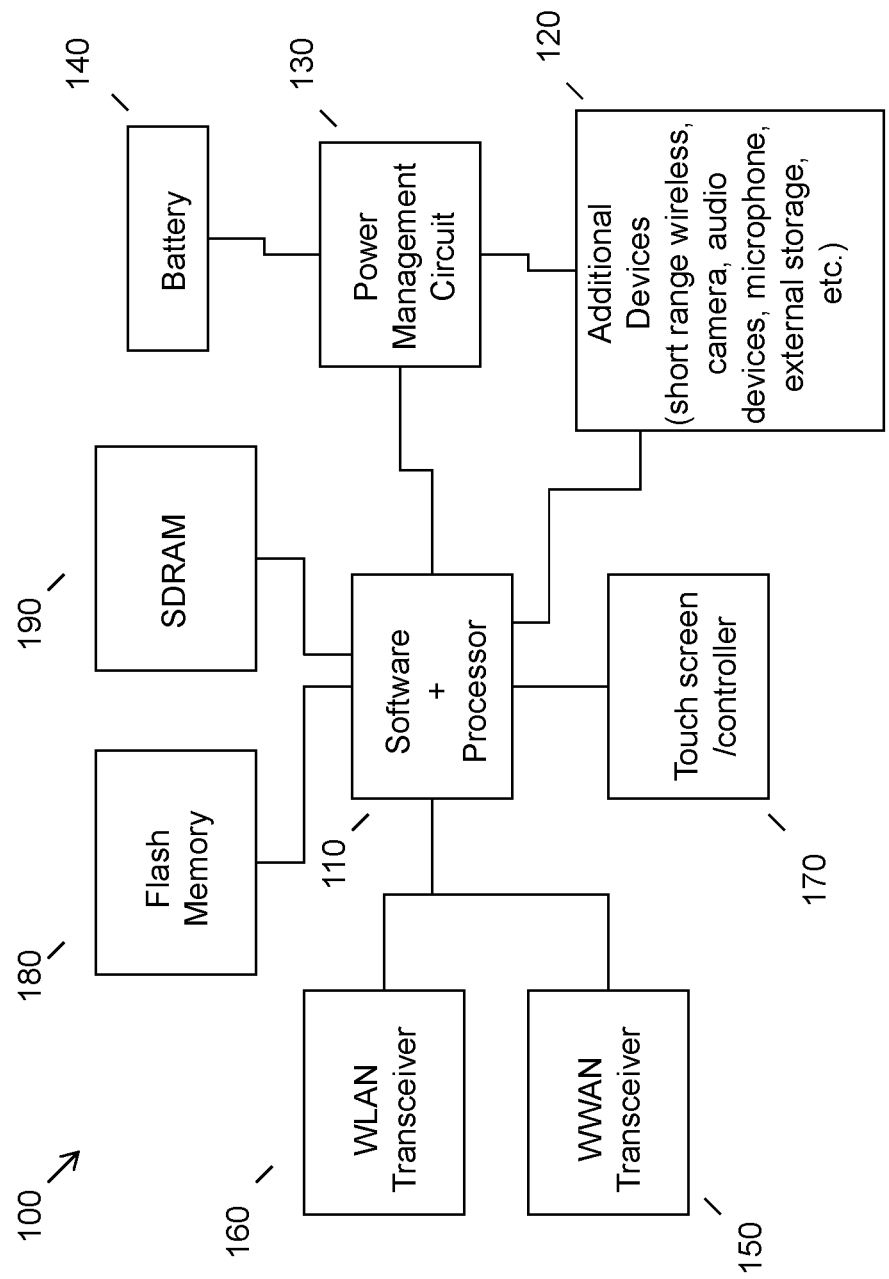
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When people take images with devices also having a display screen, the light produced by the display screen can result in a glare or lens flare within the captured image. This is particularly true when the camera lens and the display are located on the same device face, within the same plane, and/or the like. Additionally, the problem is exacerbated when an object within the scene of the image being captured is a glare causing object or an object having reflective characteristics, for example, jewelry, glasses, mirrors, windows, shiny metal, and/or the like. These objects reflect the light from the display and/or a flash of the device and cause glare and lens flare within the captured image, resulting in an image having undesirable characteristics.

Current solutions for reducing undesirable characteristics caused by glare or lens flare are image post-processing techniques. After the image is captured, different image processing techniques can be utilized to reduce or eliminate the glare or lens flare present within the image. While some of these techniques are programmed into image processing software of a device and allows the user to simply select a glare reduction selection, these are typically not advanced enough techniques to completely eliminate the effects of the glare within the image. In other words, the simplified glare reduction techniques available to an average user does not fully remove the glare or lens flare. More advanced photo processing techniques are available that allow a user to remove the glare or lens flare. However, these are time-consuming processes and require a skilled user to perform the functions. Not everyone is an advanced user that can perform the processes and not every image is worth taking the time to perform the advanced processes, particularly with the number of images that are taken.

Another conventional solution is to eliminate the glare caused by the devices by turning the device off when an image capture mode is activated. However, this is impractical with many user devices since the display device is generally the object providing feedback to the user regarding the image. In other words, the user uses the display to line up, focus, and otherwise adjust the content to be captured within the image. Without use of the display screen during the image capture mode, the user would be taking the image without any idea of how the image will be captured.

Accordingly, the described system and method provides a technique for reducing image glare in an image captured by a user device after determining a function of the user device is likely to cause the image glare. The image glare reduction system receives an indication to capture an image using a user device. For example, the system may detect that a user has entered an image capture mode of an information handling device (e.g., smart phone, laptop, computing system, smart watch, tablet, etc.).

Prior to capturing the image, the system may determine that a function of the user device may cause glare in a captured image. For example, the system may determine that a display of the device is illuminated, that a flash function is active, and/or the like. The system may also determine that the content of the image contains one or more glare causing objects, for example, reflective surfaces, and/or the like, that would cause a glare or lens flare in the image. Determining that the function may cause glare, the system modifies an attribute of the user device. For example, the system may dim or turn off the display screen, reduce a time length or preventing a flash function, and/or the like. Modification of the attribute occurs during a shutter operation of the user device that occurs while the user device is capturing the image.

Therefore, a system provides a technical improvement over traditional methods for image glare reduction. Instead of requiring post image processing to remove image glare and lens flare, the described system and method provides a technique that reduces or eliminates the cause of the image glare and lens flare before or while the image is being captured, thereby resulting an image does not have image glare or lens flare that needs to be removed. Additionally, because the system and method work before the image is captured, a user does not have to perform the additional steps of removing the image glare and lens flare present on the image, thereby eliminating the time and knowledge needed to perform such steps. Since the device function that causes the glare or lens flare is turned off only during the image capture, the user can still utilize the device to set up the image correctly, unlike conventional techniques that turn off the device functions when the image capture mode is initiated. Thus, the described system and method provides a technique that is more user friendly and does not require advanced image correction knowledge and time as compared to conventional techniques.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
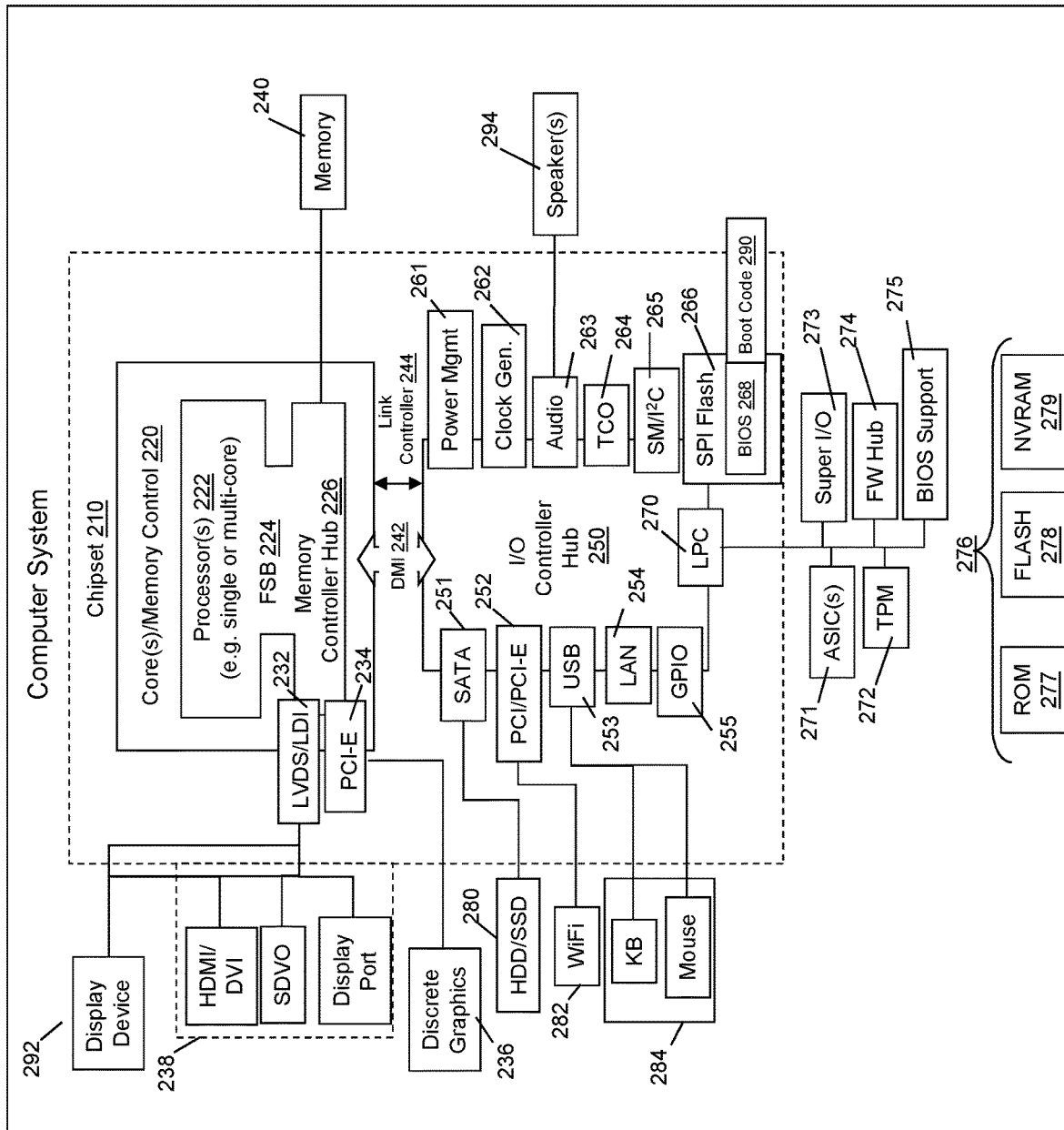
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that reduces image glare in images captured by a user device. For example, the circuitry outlined in FIG. 1 may be implemented in a tablet or smart phone embodiment, whereas the circuitry outlined in FIG. 2 may be implemented in a personal computer embodiment.

Figure 3:
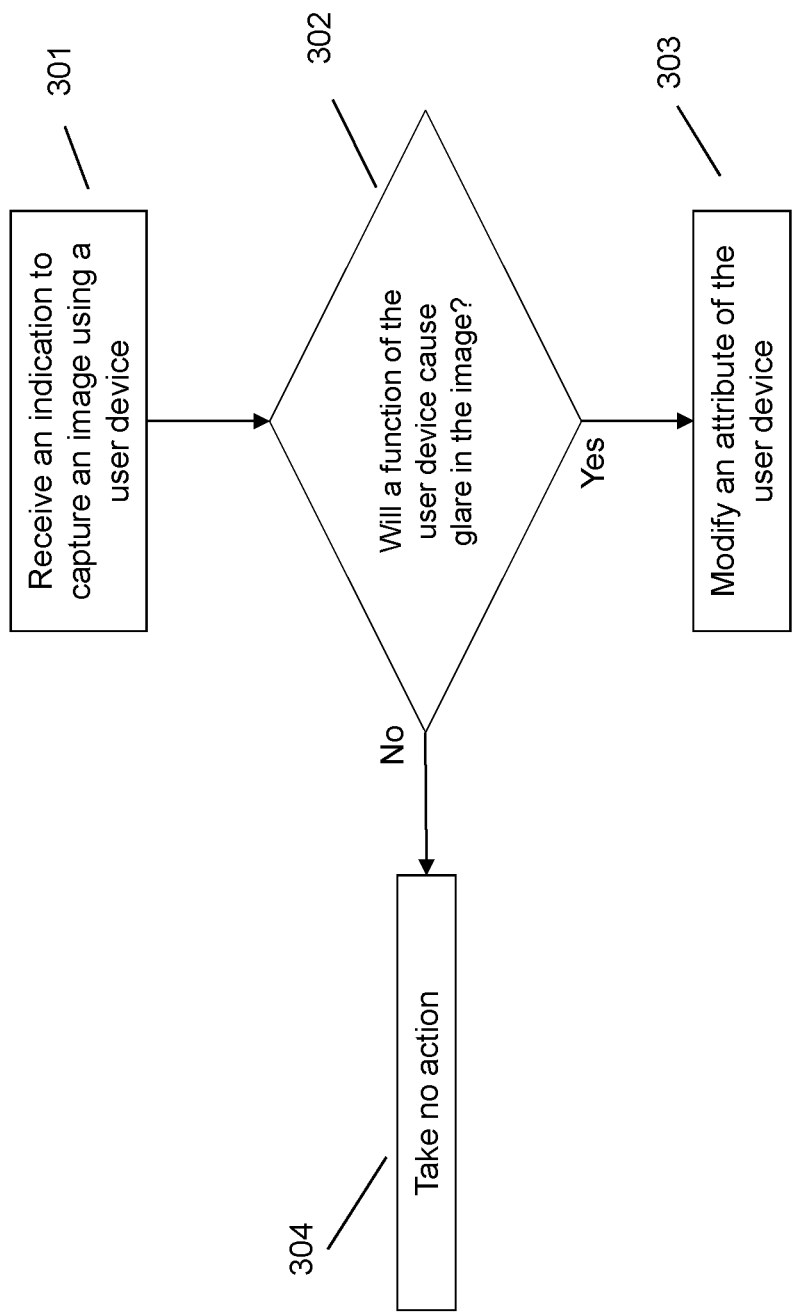
FIG. 3 illustrates an example method for reducing image glare in an image captured by a user device after determining a function of the user device is likely to cause the image glare.

FIG. 3 illustrates an example method for reducing image glare in an image captured by a user device after determining a function of the user device is likely to cause the image glare. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to reduce image glare in an image. Additionally, the image glare reduction system includes modules and features that are unique to the described system.

At 301, the image glare reduction system receives an indication to capture an image using a user device. The user device may be a user device that has both an image capture device/function and a light emitting device/function. The light emitting function may include a display screen, a flash, a flashlight, a monitor, an indication screen, and/or the like. Thus, for example, the user device may be a smart phone, cellular phone, laptop, tablet, smart watch, computing system, and/or the like. Some of the devices that may be utilized may include more than one image capture function or device (e.g., webcam, front-facing camera ("selfie camera"), rear-facing camera ("world-facing camera"), etc.) and/or more than one light emitting function. The intent of the described system is to reduce glare producing functions, thus, the light emitting function and the image capture device will generally face the same direction. However, this is not intended to limit the disclosure to only light emitting functions and image capture devices that are facing the same direction.

Continued reference will be made to a front-facing camera (referred to as a selfie camera) on a smart phone embodiment. However, this embodiment is not intended to be limiting as other use cases are contemplated and possible. For example, the same system can be applied in a laptop application where the camera is located on the same plane as the display or monitor. As another example, the system can be applied in a personal computing application that has a camera separate from the device, but that is located facing the same direction as the display. Thus, the described system and method is not limited to only a smart phone, tablet, or other portable information handling device and, instead, can be applied across all devices having both a display or other light emitting source and a camera or other image capture device.

The indication to capture an image may include a user activating an image capture function of the device. The indication to capture an image may be from the device locally or may be from a remote function. For example, the user may use a local function or button on the device to activate the image capture function such as an image capture icon, virtual button, or other shutter release button. As an example, the user may use a remote that includes a button that activates the image capture function. It should be noted that the image capture function may refer to either the image capture mode of the device (e.g., activating the image capture software of the device) or an image capture activation (e.g., providing indication to capture the image).

At 302 the image glare reduction system determines whether a function of the user device may cause glare within an image captured by the device in response to receiving the indication to capture an image. To determine whether a function of the user device may cause glare in the image, the image glare reduction system may identify that one or more light emitting functions of the device are illuminated. Light emitting functions of the device include, but are not limited to, displays, monitors, flashes, flashlights, illuminated indicators, and/or the like. Generally, the device knows if the light emitting functions are active and would, therefore, be illuminated. For example, if the display of the device is on, the display is illuminated. As another example, if the flash function is active, meaning it will be utilized when the image is captured, the device knows that it will be illuminated when the image is captured. In one embodiment, simply identifying that a light emitting function(s) is active is enough for the system to determine that glare or lens flare is likely within the image.

However, in other embodiments, in addition to the light emitting functions, the system may analyze the content of the scene that will be captured within the image. To analyze the content, the system may utilize one or more image analysis techniques to identify different objects contained within the scene, for example, people, buildings, clothing, and/or the like. Certain objects within an image will result in glare or lens flare in the image. Objects that are reflective will reflect light produced by the light emitting function, thereby causing the image glare or lens flare. Thus, the system may analyze the image to identify if reflective objects are contained within the scene, for example, windows, shiny metal, jewelry, watches, glasses, mirrors, and/or the like. The reflective object in conjunction with the light emitting function will likely result in glare or lens flare within the image. Thus, the system can identify if any of these objects are within the scene when determining that a function of the user device may cause glare in the image.

To determine if an object of the scene is one that results in image glare or lens flare, the system may identify an object and then compare it to a database of objects that have been identified as glare-producing objects, also referred to as reflective objects. If the object is included in the database of glare-producing objects, the system identifies that a function of the user device may cause glare in the image. An additional, or alternative, technique to determine if an object of the scene is one that results in image glare or lens flare, is to use historical data of a user, specifically, historical image data of a user. The system can access and analyze historical images of the user to identify images having glare or lens flare. The system can then identify, using one or more image analysis techniques, the object within the image causing the glare or lens flare. This object is identified as a glare-producing object and, upon identifying that object in a new scene, the system can identify that a glare-producing object is present within the scene. Similarly, crowd-sourced data can be used in a similar fashion. In this case, either crowd-sourced images can be analyzed for glare-producing objects or objects identified as glare-producing objects via the crowd-source data can be utilized by the system.

An additional, or alternative, technique to determine if an object of the scene is one that results in image glare or lens flare, is to use machine-learning models, neural networks, and/or other automatic learning algorithms or models. The models or algorithms can be trained using objects identified as glare-producing objects and objects identified as non-glare producing objects. Based upon this training, the models or algorithms can be deployed and make predictions about objects present within a scene regarding whether they are glare-producing objects or not. As the models make predictions, feedback regarding the predictions can be automatically ingested by the models and/or algorithms, thereby making the models and/or algorithms more accurate over time.

In the event that the system determines that one or more glare-producing objects are contained in the image, the system may perform additional analysis to determine if the attribute needs to be modified. The system may determine whether the object would cause distracting glare or lens flare. In other words, the system may determine whether the object is one of focus in the image or would result in disruption of the object(s) in focus in the image. For example, if the glare-producing object were a spoon on the ground in a picture of a group of people, where the people are the focus or subject of the image, the system may determine that the glare caused by the spoon is not significant.

One technique for identifying an area of focus of the image is to correlate the objects of focus in the image to the focus function of the device. Camera devices have the ability to focus on certain objects in the image, thereby causing other objects at different image planes to be out of focus or blurry. It can be assumed by the system that an object that is focused within the image is an object of focus or the subject of the image. Thus, if a glare-producing object is not in focus in the image, then the system can identify it as a non-focus object and as an object that should not cause a change in attribute of the device unless the glare caused by the object interferes with the focus object(s). Other techniques for identifying an area of focus are possible and contemplated, for example, a user may provide input identifying an area or object of focus, identifying important objects and labeling them as focus areas or focus objects, identifying a particular location within the image as a focus area and objects within the focus area as focus objects (e.g., the center of the image, a particular percentage of the image, etc.), and/or the like.

If the image glare reduction system determines that a function of the user device may not cause glare in the image at 302, the system may take no action at 304. In other words, the system will just capture the image with no change or modification to the attributes of the user device. If the system simply determines that a light emitting function may cause glare or lens flare, meaning the light emitting function is active during the image capture, the system may simply determine that the light emitting function is not active and may, therefore, take no action at 304. If, on the other hand, the system not only determines that a light emitting function may cause glare or lens flare, but also determines the scene includes a glare producing object, the system may take no action at 304 when no glare producing object is present in the scene, or if the glare producing object is not the focus of the image and will not interfere with the focus of the image, if a focus object determination was made by the system.

If, on the other hand, the image glare reduction system determines that a function of the user device may cause glare in the image at 302, the system may modify an attribute of the user device at 303. In other words, if the system determines that glare may be produced in the image by a function of the device, the system may change an attribute of the user device to reduce the glare in the captured image. In the embodiment where the system simply determines that a light emitting function may cause glare or lens flare, meaning the light emitting function is active during the image capture, the system may simply determine that the light emitting function is active and may, therefore, modify an attribute at 303. If, on the other hand, the system not only determines that a light emitting function may cause glare or lens flare, but also determines the scene includes a glare producing object, the system may modify an attribute at 303 when a glare producing object is present in the scene, or if the glare producing object is in the focus of the image or will interfere with the focus of the image, if a focus object determination was made by the system.

Modifying the attribute includes changing an attribute of the device so that the light emitting function does not produce glare or lens flare within the image. Thus, the attribute that is modified is based upon the light emitting function or functions that may cause the glare within the image. In other words, since the system is attempting to reduce or eliminate the image glare, the system modifies an attribute of the device to compensate for the function that may produce the glare. For example, if the light emitting function is a display, modifying the attribute may include reducing a light output of the display, turning off the display, changing a brightness of the display, and/or the like. As another example, if the light emitting function is a flash function, modifying the attribute may include reducing a time length of the flash function, preventing the flash function, changing a brightness of the flash function, and/or the like. As can be understood from these examples, other attributes can be modified based upon the light emitting function that may produce the image glare or lens flare.

Modifying the attribute occurs during a shutter operation of the user device while the image is being captured. In other words, the system performs the modifying in real-time as the image is captured and, specifically, during the shutter operation occurring when the image is captured. Since the attribute is modified during the shutter operation, the light emitting function is available both before and after the shutter operation, but does not cause the image glare or lens flare. Thus, if the system determines that a light emitting function may cause an image glare or lens flare, the light emitting function may be reduced and/or deactivated while the shutter operation is active. One distinction that should be made is between the presently described system and the systems that blink the display during an image capture. The systems that blink the display are blinking the display to provide a notification to the user that an image was captured. Thus, the blinking of the display is not coincident with the shutter action like the presently described system.

Since the camera may have set some camera settings based upon the light emitting function being active, the camera may adjust camera settings for capturing the image based upon or responsive to modifying the attribute. Some camera settings are based upon an amount of light that is being received at the camera. For example, exposure, flash, gain, aperture opening and length of opening, shutter speed, and/or the like, are camera settings that are based upon an amount of light being received at the camera. Thus, since the amount of light will be reduced during capture of the image, the system may modify these camera settings based upon the new light value caused by the modification to the attribute of the device.

After the image is captured, the system resets the attribute of the user device. In other words, whatever modification(s) was made to reduce the light emitting function will be changed back to the original settings. For example, if the display was dimmed or turned off, the system will reset light value to the original value or turn the display back on. As another example, if the flash length was reduced or prevented, the system will reset the flash length to the original value or allow the flash function. Resetting the attribute occurs right after the shutter operation is complete. In other words, the attribute is only modified during the shutter operation and immediately before and immediately after the shutter operation, the device settings and attributes will be at original or normal settings or values.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
receiving, at an image glare reduction system, an indication to capture an image using a user device;
determining, using the image glare reduction system, a function of the user device may cause glare in the image; and
modifying, using the image glare reduction system and in response to the determining the function may cause the glare, an attribute of the user device, wherein the modifying occurs during a shutter operation of the user device occurring during capture of the image.

2. The method of claim 1, wherein the function comprises a display setting and wherein the modifying the attribute comprises reducing a light output of the display.

3. The method of claim 1, comprising resetting the attribute of the user device after the image is captured.

4. The method of claim 1, wherein the determining comprises analyzing content of a scene to be captured in the image.

5. The method of claim 4, wherein the determining comprises identifying, within the content of the scene, an object that results in the glare in the image.

6. The method of claim 1, comprising adjusting camera settings for capturing the image responsive to the modifying.

7. The method of claim 1, wherein the function comprises a flash function and wherein the modifying the attribute comprises reducing a time length of the flash function.

8. The method of claim 1, wherein the function comprises a flash function and wherein the modifying the attribute comprises preventing the flash function.

9. The method of claim 1, wherein the determining comprises utilizing at least one of: a machine-learning model, crowd-sourced data, and historical user data.

10. The method of claim 1, wherein the function comprises a display setting and wherein the modifying the attribute comprises turning off the display.

11. An information handling device, the information handling device comprising:
a processor;
a memory device that stores instructions that, when executed by the processor, causes the information handling device to:
receive, at an image glare reduction system, an indication to capture an image using a user device;
determine, using the image glare reduction system, a function of the user device may cause glare in the image; and
modify, using the image glare reduction system and in response to the determining the function may cause the glare, an attribute of the user device, wherein the modifying occurs during a shutter operation of the user device occurring during capture of the image.

12. The information handling device of claim 11, wherein the function comprises a display setting and wherein the modifying the attribute comprises reducing a light output of the display.

13. The information handling device of claim 11, comprising resetting the attribute of the user device after the image is captured.

14. The information handling device of claim 11, wherein the determining comprises analyzing content of a scene to be captured in the image.

15. The information handling device of claim 14, wherein the determining comprises identifying, within the content of the scene, an object that results in the glare in the image.

16. The information handling device of claim 11, comprising adjusting camera settings for capturing the image responsive to the modifying.

17. The information handling device of claim 11, wherein the function comprises a flash function and wherein the modifying the attribute comprises reducing a time length of the flash function.

18. The information handling device of claim 11, wherein the function comprises a flash function and wherein the modifying the attribute comprises preventing the flash function.

19. The information handling device of claim 11, wherein the function comprises a display setting and wherein the modifying the attribute comprises turning off the display.

20. A product, the product comprising:
a computer-readable storage device that stores executable code that, when executed by a processor, causes the product to:
receive, at an image glare reduction system, an indication to capture an image using a user device;
determine, using the image glare reduction system, a function of the user device may cause glare in the image; and
modify, using the image glare reduction system and in response to the determining the function may cause the glare, an attribute of the user device, wherein the modifying occurs during a shutter operation of the user device occurring during capture of the image.

* * * * *